United States Patent Office 3,778,464
Patented Dec. 11, 1973

3,778,464
SUBSTITUTED HYDROXYLAMINE
ANTI-OXIDANTS
Peter Klemchuk, 148 Upland Road,
Yorktown Heights, N.Y. 10598
No Drawing. Original application Apr. 13, 1971, Ser. No. 133,700, now abandoned. Divided and this application Oct. 10, 1972, Ser. No. 296,450
Int. Cl. C07c *101/00*
U.S. Cl. 260—482 P                                      1 Claim

ABSTRACT OF THE DISCLOSURE

Substituted hydroxylamines exhibit activity as anti-oxidants for a diverse group of substrate materials under specific conditions of exposure to an oxidizing environment. Illustrative embodiments of substituted hydroxylamine anti-oxidants are bis(p-nitrobenzyl)hydroxylamine and 2 - diethylamino-4,6-bis(N-n-propyl-N-hydroxyamino)-s-triazine.

---

This is a division of application Ser. No. 133,700, filed on Apr. 13, 1971, now abandoned.

The present invention relates to substituted hydroxylamines and more particularly to a process for stabilizing a vast and diverse group of organic materials against oxidation; that is against deterioration in the presence of air, oxygen or ozone, and to stabilized compositions containing said substituted hydroxylamines.

The prevention of oxidation of various organic materials is obviously of primary industrial concern and therefore anti-oxidants are used in or added to a wide variety of commercial products such as rubber products, oils, plastics, organometallic products, foods, etc., which are normally subject to oxidative deterioration.

One group of hydroxylamine anti-oxidants of the present invention is represented by the formula

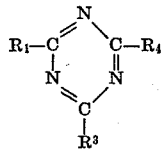

wherein $R_1$, $R_2$ and $R_3$ are alkyl, dialkyl amino, monoalkyl amino, hydroxylamino, alkyl hydroxylamino, alkylthio, alkoxy, phenoxy or alkyl phenoxy, the alkyl and alkoxy groups containing from 1 to 12 carbon atoms, with the proviso that at least one of $R_1$, $R_2$ and $R_3$ is a hydroxylamino or alkyl hydroxylamino group.

Another group of compounds is represented by the formula

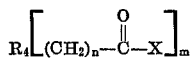

wherein $R_4$ is HON, HONH or $HONR_5$, wherein $R_5$ is alkyl or phenylalkyl, the alkyl groups containing from 1 to 3 carbon atoms, $m$ and $n$ are the integers 1 or 2, X is amino, mono alkylamino, di-alkylamino or alkoxy, the alkyl and alkoxy groups containing from 1 to 12 carbon atoms.

A further group of compounds of the present invention is represented by the formula

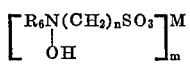

wherein $R_6$ is alkyl or phenylalkyl, the alkyl groups containing from 1 to 3 carbon atoms, $n$ is an integer from 1 to 4 $m$ is an integer from 1 to 3 and M is a metal cation such as an alkali metal or alkaline earth metal.

Still another group of compounds of the present invention is represented by the formula

wherein $R_7$ or $R_8$ is alkyl containing from 1 to 3 carbon atoms, benzyl, chlorobenzyl, nitrobenzyl, benzhydryl or triphenylmethyl with the proviso that only one of $R_7$ or $R_8$ is alkyl and that $R_8$ is hydrogen when $R_7$ is benzhydryl or triphenylmethyl, or $R_7$ and $R_8$ taken together with the nitrogen atom form a heterocyclic group such as morpholino, piperidino or piperazino.

The valuable and novel hydroxylamine compounds of the present invention are prepared by a variety of conventional procedures. In one procedure, cyanuric chloride or a substituted mono- or di-alkyl amino-chloro-s-triazine is reacted with hydroxylamine or alkyl hydroxylamine. An alternative procedure involves the reaction of a benzyl halide with hydroxylamine or alkyl hydroxylamine. Another procedure involves reaction of a di-substituted amine that is, a di-alkylamine, with methyl acrylate to form a tertiary amine which is then oxidized as, for example, with peracetic acid and the resulting amine oxide is then treated with alkali such as sodium hydroxide, ammonium hydroxide, sodium carbonate and the like, to form the desired hydroxylamine product. Still another procedure involves the reaction of hydroxylamine or mono-alkyl hydroxylamine with an acrylic acid ester or amide such as, for example, ethyl acrylate, lauryl acrylate or acrylamide.

A further procedure for preparing novel hydroxylamines of the present invention involves reacting a mono-alkyl hydroxylamine with a sultone, i.e., a cyclic sulfonate ester.

It has been found that the substituted hydroxylamine compounds of the present invention are excellent anti-oxidants and consequently, on incorporating such substances into various organic substances which undergo oxidative deterioration in the presence of air, oxygen or ozone, there is a surprising and unexpected inhibition of said oxidative deterioration.

Thus the compounds of this invention are useful as anti-oxidants in a wide variety of oxygen sensitive materials. For example, liquid hydrocarbon fuels such as, kerosine, fuel oil, etc. are characterized by increased storage stability by including therein one or more of the oxidants of the present invention. It has been found that liquid hydrocarbon fuels such as gasoline which contain organometallic additives such as tetraethyl lead as well as other organometallic compounds which are used as fuel adidtives exhibit increased oxidative stability by use of the compounds of the present invention. This is also true of lubricating oils and functional fluids derived from naturally occurring hydrocarbons such as turbine, hydraulic, transformer and other highly refined industrial oils; soaps and greases; plastic materials; synthetic polymers such as polyethylene and polypropylene, etc. The addition of small amounts of the compounds of the present invention to the aforesaid materials greatly increase their resistance to deterioration in the presence of air, oxygen or ozone. Furthermore, such fuels which contain halogen and phosphorus-containing scavengers for the organometallic compounds referred to above are also stabilized by the anti-oxidants of the present invention.

It should also be mentioned that the compounds of the present invention are also valuable in protecting paraffin and micro-crystalline petroleum waxes against the oxidative deterioration which leads to rancidity. Furthermore, the compounds of this invention are extremely useful in the stabilization of fats and oils of animal or vegetable origin which become rancid during periods of storage due to oxidative deterioration. Typical fats and oils include butter fat, lard, beef tallow, fish oils such as cod liver oil, as well as various foods containing or prepared in animal fats which tend to deteriorate, i.e., potato chips, fried fish, donuts, crackers and various types of pastry as well as cakes and cookies. Still further, fat fortified animal feeds and fish meals used as animal feeds are not only protected against oxidative deterioration by the use of the hydroxylamine compounds of the present invention but in addition, the aforesaid compounds inhibit the degradation of vitamins A, D and E and certain of the B complex vitamins. The compounds of the present invention are also advantageously helpful in compositions containing oils derived from vegetable sources such as castor oil, soybean oil, rapeseed oil, coconut oil, olive oil, palm oil, corn oil, sesame oil, peanut oil, babassu oil, citrus oil and cottonseed oils as well as compositions containing these oils such as peanut butter, peanuts and other whole nuts, salad dressings, margarine and other vegetable shortenings.

Specific hydroxylamines which are useful as antioxidants include, for example, N,N-dibenzyl hydroxylamine, 2-diethylamino - 4,6 - bis-(N-methyl-N-hydroxyamino)-s-triazine of the formula

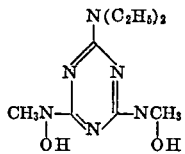

2,4-bis(N-hydroxyamino) - 6 - diethylamino-s-triazine of the formula

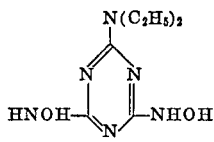

2,4-bis(dibutylamino)-6-N-hydroxyamino-s-triazine of the formula

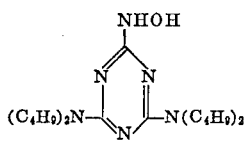

Bis - (3,5-di-t-butyl-4-hydroxybenzyl)hydroxyamine of the formula

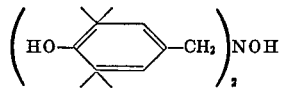

Triphenylmethyl hydroxylamine, monobenzylhydroxylamine, benzhydryl hydroxylamine and diethyl β,β'-hydroxyiminodipropionate of the formula $$HON(CH_2CH_2CO_2C_2H_5)_2$$

2-octylthio - 4,6 - bis-N-(hydroxyamino)-s-triazine of the formula

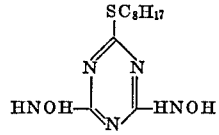

N-hydroxy 2,2,6,6-tetramethyl - 4 - piperidone of the formula

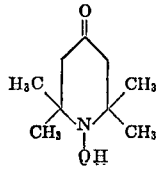

2,4-bis-(octylthio) - 6 - N-hydroxyamino-s-triazine of the formula

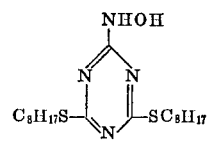

Bis-(p-nitrobenzyl)hydroxylamine of the formula

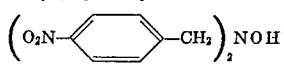

2,4-bis-(dodecylamino) - 6 - N-hydroxyamino-s-triazine of the formula

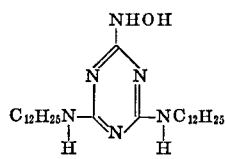

Didodecyl β,β' hydroxyiminodipropionate of the formula $$HON(CH_2CH_2CO_2C_{12}H_{25})_2$$

N-hydroxymorpholine

N-hydroxypiperidine 2-dodecylamino - 4,6 - bis-N-hydroxyamino-s-triazine of the formula

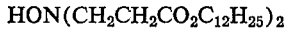

Sodium 3-(N-n-propyl-N-hydroxyamino)propane sulfonate of the formula

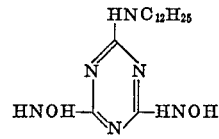

Bis-(4-chlorobenzyl)hydroxylamino of the formula

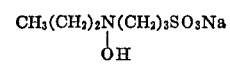

Bis-(2-chlorobenzyl) hydroxylamine of the formula

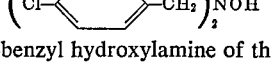

2 - dodecylamino - 4,6 - bis-(N-n-propyl-N-hydroxyamino)-s-triazine of the formula

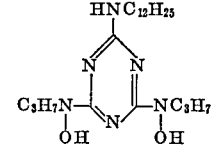

Bis-(2,6-dichlorobenzyl) hydroxylamine of the formula

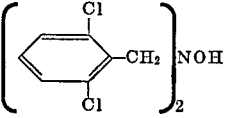

Bis-(3,4-dichlorobenzyl) hydroxylamine of the formula

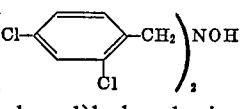

Bis-(2,4-dichlorobenzyl)hydroxylamine of the formula

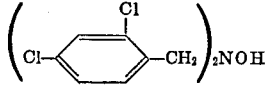

2-diethylamino - 4,6 - bis - (N - n - propyl-N-hydroxyamino)-s-triazine of the formula

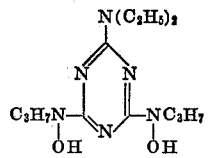

3-(N-propyl - N - hydroxyamino)propionamide of the formula

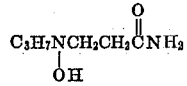

Bis(4-methylbenzyl)hydroxylamine of the formula

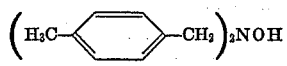

β,β'-Hydroxyimino-bis-propionamide of the formula

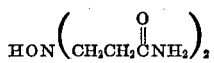

N - propyl-N-(p-chlorobenzyl)hydroxylamine of the formula

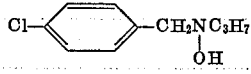

2-(N-n-propylhydroxyamino)-4,6 - bis-(diethylamino)-s-triazine of the formula

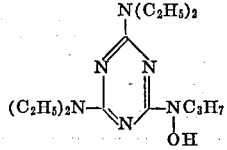

β,β' - Hydroxyimino-bis-(N,N-dimethyl-propionamide) of the formula

Experiments have shown that the hydroxylamines of the present invention exhibit remarkable radical trapping ability (equivalent to anti-oxidant activity) in Tetralin oxidation (tetrahydronaphthalene). For example, it was found that many of the hydroxylamines tested were considerably superior to the phenolic anti-oxidants in inhibiting the rate of Tetralin oxidation during the induction period. This is indicated by the rates of oxygen uptake during the induction periods. Table 1 below sets out a compilation of data on Tetralin oxidation tests.

TABLE I

Performance in tetralin oxygen uptake test (60° C., 2.50 m. tetralin $2.0 \times 10^{-3}$ m. antioxidant $3.0 \times 10^{-2}$ m. azo bis isobutyronitrile, chlorobenzene solution)]

| Anti-oxidant | Initial slope ($\times 10^2$) ml. | Induction period, min. |
|---|---|---|
| None | 30.0 | None |
| N,N-dibenzylhydroxylamine | 0.12 | 129 |
| 2-diethylamino-4,6-bis-(N-methyl-N-hydroxyamine)-s-triazine | 0.13 | 111 |
| 2,4-Bis-(dibutylamino)-6-N-hydroxyamino-s-triazine | 0.36 | 207 |
| Bis-(3,5-di-t-butyl-4-hydroxybenzyl)hydroxylamine | 0.41 | 121 |
| Monobenzylhydroxylamine | 0.34 | 190 |
| Bis-(p-nitrobenzyl)hydroxylamine | 0.00 | 176 |
| N-hydroxymorpholine | 0.38 | 175 |
| Bis-(4-chlorobenzyl)hydroxylamine | 0.62 | 168 |
| Bis-(2-chlorobenzyl)hydroxylamine | 0.34 | 157 |
| Bis-(2,6-dichlorobenzyl)hydroxylamine | 0.36 | 189 |
| 2-diethylamino-4,6-bis-(N-n-propyl-N-)hydroxyamino-s-triazine | 0.25 | 166 |

FIG. 1 below hows a typical plot of oxygen uptake versus time for an inhibited Tetralin oxidation. The induction period slope represents a measure of the radical trapping ability of the anti-oxidant; the lower the slope, the more efficient is the radical trapping. It is noted that there is a dramatic increase in radical trapping ability when anti-oxidants are added.

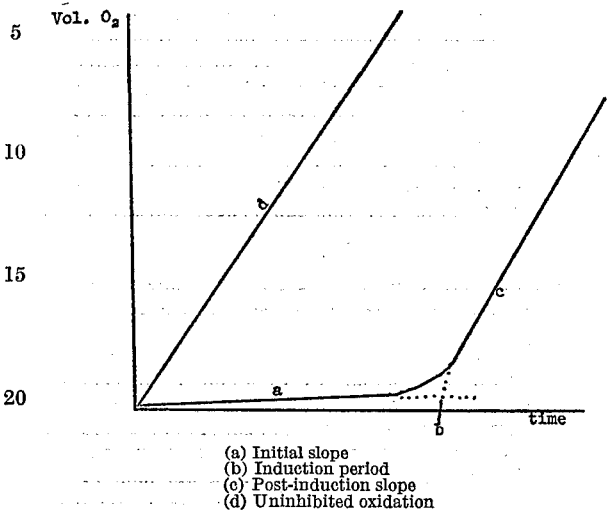

FIG. 1

Plot of oxygen uptake vs. time for hydroxyylamine anti-oxidant (a) Initial slope
(b) Induction period
(c) Post-induction slope
(d) Uninhibited oxidation The length of the induction period is a matter of stoichiometry, usually two radicals being trapped per anti-oxidant molecule. However, deviations from this 2:1 ratio are freqeuntly observed, due presumably, to inhibitor instability or to chemistry which is different from the usual. During the post induction period, the rate of oxygen uptake should be the same as that for uninhibited Tetralin oxidation, but this is not always the case and the reasons for deviations are not known.

Hydroxylamine anti-oxidants have been tested in a variety of representative substrate materials as set out in the following tables. For example, the hydroxylamine anti-oxidants perform well in cyclohexene at 100° C. (Table II), in lard at 100° C. (Table III) and are also operative in mineral oil (Table IV) and ABS resin at 300° F. (Table V). The tests given in Table VI show that the subject hydroxylamines exhibit a remarkable light stabilization when incorporated in polypropylene.

TABLE II

Anti-oxidant Performance in Cyclohexene, 100° C.

| Anti-oxidant: | Induction period—minutes |
|---|---|
| None | 29.5 |
| Didodecyl β,β-hydroxyimino-dipropionate | 85 |
| N,N-dibenzyl hydroxylamine | 78 |
| N-hydroxymorpholine | 131 |
| 2 - diethylamino-4,6-bis-(N-methyl-N-hydroxyamino)-s-triazine | 148 |
| N-hydroxypiperidine | 57 |
| 2,4 - bis-(dibutylamino) - 6-N-hydroxyamino-s-triazine | 110 |
| Bis-(4-chlorobenzyl)-hydroxylamine | 60 |
| Bis - (3,5-di-t-butyl-4-hydroxybenzyl)hydroxylamine | 58 |
| Bis-(2-chlorobenzyl)-hydroxylamine | 69 |
| Monobenzylhydroxylamine | 49 |
| 2 - dodecylamino - 4,6-bis-(N-n-propyl-N-hydroxyamino)-s-triazine | 103 |
| Bis-(2,6-dichlorobenzyl)hydroxylamine | 71 |
| Diethyl β,β'-hydroxyiminodipropionate | 70 |
| Bis-(3,4-dichlorobenzyl)hydroxylamine | 85 |
| Benzhydryl hydroxylamine | 55 |
| Bis-(2,4-dichlorobenzyl)hydroxylamine | 85 |
| 2 - octylthio - 4,6 - bis-(N-hydroxyamino)-s-triazine | 98 |
| 2 - diethylamino - 4,6 - bis-(N-n-propyl-N-hydroxyamino-s-triazine | 183 |
| Bis-(p-nitrobenzyl)hydroxylamine | 123 |
| 2,4 - bis-(dodecylamino)-6-N-hydroxyamino-s-triazine | 110 |

TABLE III

Performance of Hydroxylamine Anti-oxidants in Lard; 100°, 0.05% Anti-oxidant

| Anti-oxidant: | Induction period—hours |
|---|---|
| None | 4 |
| N,N-dibenzylhydroxylamine | 48 |
| 2 - diethylamino - 4,6-bis-(N-methyl-N-hydroxyamino)-s-triazine | 32 |
| 2,4 - bis-(dibutylamino) - 6 - N-hydroxyamino-s-triazine | 24 |
| Bis - (3,5 - di-t-butyl-4-hydroxybenzyl)hydroxylamine | 75 |

TABLE IV

Performance of Hydroxylamine Anti-oxidants in Mineral Oil, 150° C., 0.1% Anti-oxidant

| Anti-oxidant: | Induction period—hours |
|---|---|
| None | 2.3 |
| 2 - diethylamino - 4,6 - bis-(N-methyl-N-hydroxyamino)-s-triazine | 42 |
| 2,4 - bis-(dibutylamino)-6-N-hydroxyamino-s-triazine | 13 |

TABLE V.—HYDROXYLAMINES PERFORMANCE IN ABS RESIN, 300° F.

| Compound | Initial | Carbonyl values/mil at times indicated | | | | |
|---|---|---|---|---|---|---|
| | | 30 min. | 60 min. | 90 min. | 120 min. | 150 min. |
| 0.1% inhibitor of— | | | | | | |
| None | .060 | .128 | 0.22 | (a) | (a) | (a) |
| 2-diethylamino-4,6-bis-N-methyl-N-hydroxyamino)-s-triazine | .044 | .041 | .042 | .048 | .054 | 0.089 |
| 2,4-bis-(dibutylamino)-6-N-hydroxyamino-s-triazine | .047 | .080 | .13 | .20 | (a) | (a) |
| 0.1% inhibitor, 5.0% titanox AMO [b] of— | | | | | | |
| None | .048 | .105 | .19 | .21 | (a) | (a) |
| 2-diethylamino-4,6-bis(N-methyl-N-hydroxy amino)-s-triazine | .044 | .044 | .047 | .055 | .080 | 0.12 |
| 2,4-bis-(dibutylamino)-6-N-hydroxyamino-s-triazine | .043 | .099 | 0.15 | .20 | (a) | (a) |

[a] Too high to measure accurately.
[b] Anatase titanium dioxide.

TABLE VI

Performance of Hydroxylamine Anti-oxidants in Polypropylene 0.5% Anti-oxidant

Anti-oxidants incorporated by milling

| Anti-oxidant: | Fade-Ometer failure time—hours |
|---|---|
| None | 100 |
| 2 - diethylamino - 4,6 - bis-(N-methyl-N-hydroxyamino)-s-triazine | 900 |
| 2,4 - bis-(dibutylamino) - 6 - N-hydroxyamino-s-triazine | 700 |

Anti-oxidants incorporated by powder pressing

| Anti-oxidant: | |
|---|---|
| None | 60 |
| 2 - diethylamino - 4,6-bis-(N-methyl-N-hydroxyamino)-s-triazine | 780 |
| 2 - octylthio - 4,6 - bis-(N-hydroxyamino)-s-triazine | 280 |
| 2,4 - bis-(octylthio) - 6 - N-hydroxyamino-s-triazine | 480 |
| 2,4 - bis-(dodecylamino) - 6 - N-hydroxyamino-s-triazine | 660 |

The following examples illustrate the procedures used for the production of the subject substituted hydroxylamines. The temperatures therein are given in degrees centigrade.

EXAMPLE 1

2-octylthio-4,6-bis-(N-hydroxyamino)-s-triazine

Hydroxylamine hydrochloride (117.3 g., 1.69 mole) was dissolved in water and to this solution there was added 62.5 g. (1.56 moles) of a sodium hydroxide solution, the addition being effected dropwise at a temperature of less than 22°. 2-octylthio-4,6-dichloro-s-triazine (60 g., 0.186 moles) in 180 ml. of dioxane was added to this solution, the addition being effected in a thin stream for a period of about 10 minutes at a temperature less than 15°. A gummy solid separated after a period of stirring. The mixture was warmed to a temperature of between 55° and 60°, and stirred at that temperature for one hour. The mixture was then heated at reflux for three hours and then poured into a liter of water after cooling. There was obtained a gummy precipitate. The solution was decanted and the solid was dissolved in ether. The phases were separated and the decanted solution was extracted with ether. The ethereal solutions were combined and washed with water. The ethereal solution was concentrated first at atmospheric pressure to remove the ether and finally under vacuum. There was obtained 44.2 g. of a pale, purple solid concentrate with a strong odor of octyl mercaptan. This material was recrystallized from ethyl acetate and there was obtained a yield of 21.9 g. of colorless crystals with a melting point of 145°–146.5°.

Analysis for $C_{11}H_{21}N_5O_2S$.—Calc'd (percent): C, 45.97; H, 7.37; N, 24.37. Found (percent): C, 45.73; H, 7.16; N, 24.16.

EXAMPLE 2

2,4-bis-(octylthio)-6-N-hydroxyamino-s-triazine

The procedure set out in Example 1 above was followed except that 58.6 g. (0.845 mole) of hydroxyamine hydrochloride and 2,4-bis-(octylthio)-6-chloro - s - triazine were used. The reaction was carried out and at the end of the reaction period, the product was cooled and allowed to stand overnight. Two liquid phases were present. The upper organic phase solidified. The reaction product was poured into 1 liter of water, filtered and washed with water. This was followed by drying under vacuum and there was obtained a yield of 72 g. of product with a melting point of 87°–90°. On recrystallization from ethanol, there was obtained 54.7 g. of a product with a melting point of 91.5°–92.5°. The product was recrystallized from ethanol with a charcoal treatment. Product recovery 45.5 g.; M.P. 92.5°–93.5°.

Analysis for $C_{19}H_{36}N_4OS$.—Calc'd (percent): C, 56.9; H, 9.06; N, 13.99. Found (percent): C, 57.32, 57.34; H, 9.06, 9.08; N, 14.09, 14.03.

EXAMPLE 3

Bis-(p-nitrobenzyl hydroxylamine)

Hydroxylamine hydrochloride (31.5 g., 0.45 mole) was dissolved in 75 milliliters of water and the solution was then cooled to a temperature of 0°. Sodium hydroxide (18.6 g., 0.45 mole) in 75 mls. water was then added at a temperature of 0°–5°. A solution of 51.5 g. of 4-nitrobenzyl chloride (0.3 mole) in 500 mls. was added and the mixture was then heated to reflux for four hours. These was some precipitate formed which was filtered off while hot. The solution was then cooled and the product filtered and washed with water. The product weighed about 23 g. (slightly moist). On recrystallization from methyl Cellosolve/water, yellow crystals were obtained—18.4 g. melting between 159° and 161°.

Analysis for $C_{14}H_{13}N_3O_5$.—Calc'd (percent): C, 55.44; H, 4.32; N, 13.86. Found (percent): C, 55.17; H, 4.36; N, 13.93.

EXAMPLE 4

Didodecyl β,β'-hydroxyiminodipropionate

Hydroxylamine hydrochloride (4.0 g.) was dissolved in 100 mls. of methanol and the resulting solution was added, at a temperature of 10° to 2.7 g. of sodium methoxide in 50 mls. methanol. A solution of 24.0 g. of lauryl acrylate in 100 mls. of methanol was added at 5° and the temperature was allowed to rise slowly. At 15°, the reaction was noticeably strongly exothermic and needed cooling. At the same time, the reaction mixture thickened and 100 mls. of ether was added to keep it mobile. The mixture was stirred overnight. The solvent was evaporated, the residue taken into 600 mls. of ether and the organic solution was extracted with a concentrated sodium chloride solution, dried, filtered and evaporated. The white amorphous residue was recrystallized from alcohol (200 mls.). There was obtained a yield of 18.0 g. of product melting between 55° and 57°.

Analysis for $C_{30}H_{59}NO_5$.—Calc'd (percent): C, 70.13; H, 11.58; N, 2.73. Found (percent): C, 70.00; H, 11.50; N, 2.68.

EXAMPLE 5

2-dodecylamino-4,6-bis-(N-n-propyl-N-hydroxyamino)-s-triazine

A solution of 1 mole of dodecylamine in dioxane was added in about twenty minutes at a temperature of less than 25°, maintained with ice bath cooling, to a thin slurry of cyanuric chloride in dioxane/water. An aqueous solution of 1 mole of sodium hydroxide was added thereto rapidly at a temperature of less than 40° and the reaction mixture was then poured into a liter of water. A light tan gummy solid solidified which was filtered, washed with water and dried under vacuum to constant weight. A yield of 157.0 g. (94.5%) of product was obtained with a melting point of 63°–65°. The product 2-dodecylamino-4,6-dichloro-s-triazine, was recrystallized from n-heptane and was obtained in the form of a colorless amorphorus product melting between 64.0° and 65.0°.

A dioxane solution of 15.8 g. (0.21 mole) of n-propyl hydroxylamine in a dioxane solution was added to a slurry of 33.3 grams (0.10 mole) of 2-dodecylamino-4,6-dichloro-s-triazine in dioxane over a 30 minute period at a temperature of less than 5°. A sodium hydroxide solution was added at a temperature of less than 5° until the reaction mixture was slightly alkaline to phenolphthalein. The solution was warmed at a temperature between 45° and 50° for one hour at the end of which time the remainder of sodium hydroxide solution was added to make a total of 0.20 mole. The reaction product was filtered at 20° to remove a small amount of colorless solid. The light purple filtrate was added to about 1500 mls. of ice cold water. A gummy precipitate was obtained and the material was decanted, washed with water and dried under vacuum. The yield of tacky purple solid was 35.0 under vacuum. The yield of tacky purple solid was 35.0 g. (85.4%). The product was recrystallized twice from n-heptane and there was obtained the desired product melting between 91.5° and 93.0°.

Analysis for $C_{21}H_{42}N_6O_2$.—Calc'd (percent): C, 61.43; H, 10.31; N, 20.47. Found (percent): C, 61.33; H, 10.24; N, 20.48.

EXAMPLE 6

2-dodecylamino-4,6-bis-(N-hydroxyamino)-s-triazine 2-dodecylamino - 4,6 - dichloro - s - triazine was prepared, using the procedure described in Example 5 above.

A solution of free hydroxylamine was prepared under nitrogen by the addition, at a temperature of less than 22° of an aqueous solution of 1.46 moles of sodium hydroxide to a concentrated aqueous solution of 1.60 moles of hydroxylamine hydrochloride. A hot dioxane solution of 66.6 g. (0.20 mole) of 2-dodecylamino-4,6-dichloro-s-triazine was added at a temperature of less than 20°. The reaction mixture was maintained at a temperature between 55° and 60° for one hour and then heated at reflux for three hours. The cooled reaction mixture was poured into two liters of cold water. There was obtained a gummy solid which hardened on standing. The yield of crude material was 67.4 g. (103%), and this material was recrystallized once from dioxane and twice from methanol. The melting point of the resulting product was 138.0°–140° (decomposition).

Analysis for $C_{15}H_{30}N_6O_2$.—Calc'd (percent): C, 55.19; H, 9.36; N, 25.75. Found (percent): C, 55.62; H, 9.44; N, 25.53.

EXAMPLE 7

2,4-bis-(dodecylamino)-6-N-hydroxyamino-s-triazine 2,4 - bis - (dodecylamino) - 6 - chloro - s - triazine was prepared following the procedure deescribed in Examples 5 and 6 above for the preparation of 2-dodecylamino-4,6 - dichloro-s-triazine except that two moles of the amine were used with one mole of cyanuric chloride. The reaction with hydroxylamine was carried out as described, using the procedure of Example 6 above, except that the following quantities of materials were used: 0.37 mole of sodium hydroxide, 0.40 mole of hydroxylamine hydrochloride, 0.10 mole of s-triazine derivative. The crude product was obtained in a 41.2 g. yield (86.3 percent) with a melting point of 125°–127°. On recrystallization, twice from dioxane, the desired product was obtained, possessing a melting point of 124°–125.5°.

Analysis for $C_{27}H_{54}N_6O$.—Calc'd (percent): C, 67.73; H, 11.37; N, 17.56. Found (percent): C, 67.79; H, 11.10; N, 17.67.

EXAMPLE 8

2-diethylamino-4,6-bis-(N-n-propyl-N-hydroxyamino)-s-triazine

One mole of aqueous diethylamine was added over a 30 minute period to one mole of cyanuric chloride, at a temperature of 0–5° in aqueous acetone. Aqueous sodium carbonate solution (0.5 mole) was added in twenty minutes at a temperature of 0°–5°. The slurry was stirred at 0°–5° for 1¼ hours, and filtered. The filter cake was washed twice with cold water, and dried under vacuum. The yield of colorless crystalline 2-diethylamino-4,6-dichloro-s-triazine was 83.8 g. (75.7%); melting point 74°–77°. On recrystallization from n-heptane, the melting point was found to be between 76.5° and 78.5°.

To a solution of 15.0 g. (0.20 mole) of n-propyl-hydroxylamine in 60 millimeters of 1:1 dioxane/water was added, over a thirty minute period at 0°–5°, a solution of 2 - diethylamino - 4,6 - dichloro - s - triazine in 75 mls. of dioxane. The mixture was heated at 55°–60° for ninety minutes, and refluxed for 30 minutes. A solution of 4.0 g. (0.10 mole) of sodium hydroxide was added, bringing the pH to a slight pink color with phenolphthalein. The reaction product was refluxed for three hours more and then poured into one liter of cold water. After standing, the reaction product solidified. This product was filtered, washed with water and then dried. The crude product (13.9 g., 93.3% yield) was recrystallized three times from petroleum ether. The colorless needles obtained had a melting point of 84.0°–86.0°.

Analysis for $C_{13}H_{26}N_6O_2$.—Calc'd (percent): C, 52.32; H, 8.78; N, 28.17. Found (percent): C, 52.58; H, 8.88; N, 28.20.

EXAMPLE 9

2-(N-n-propylhydroxyamino)-4,6-bis-(diethylamino)-s-triazine 2,4 - bis - (diethylamino) - 6 - chloro-s-triazine was prepared by the addition, at 0°–5°, of 2 moles of an aqueous solution of diethylamine to an acetone-water slurry containing one mole of cyanuric chloride. Two moles of sodium hydroxide solution was added at 45°– 50° while maintaining the alkalinity slightly below the phenolphthalein end point. The resulting oil was separated, dissolved in ether, extracted wth water, dried with anhydrous magnesium sulphate, filtered and concentrated to constant weight. There was obtained a 94% yield of a liquid product.

To a solution of 15.0 g. (0.2 mol) of n-propylhydroxylamine in 60 mls. of 1:1 dioxane/water was added in 30 minutes at 0°–5°, a solution of 25.7 g. (0.10 mol) of 2,4 - bis - diethylamino - 6 - chloro-s-triazine in 30 mls. of dioxane. The mixture was warmed to 55° for 90 minutes and refluxed for 30 minutes. The reaction mixture was cooled to 50° and a solution of 4 g. (0.1 mol) of sodium hydroxide in 20 mls. of water was added as needed, while maintaining the pH slightly below the red of phenolphthalein. About 24 hours was required for the completion of the reaction period. The reaction mixture was poured into 2 liters of water. The product was extracted into ether. The ethereal solution was extracted with aqueous hydrochloric acid which was neutralized with aqueous sodium hydroxide liberating the product which was dissolved in ether, washed with water, dried and concentrated at a constant weight. The yield of colorless liquid product was 20.8 g. (70.2% yield); $n_D^{25}$ 1.5211.

Analysis for $C_{14}H_{28}N_6O$.—Calc'd (percent): C, 56.73; H, 9.52; N, 28.36. Found (percent): C, 56.38; H, 8.83; N, 28.20.

EXAMPLE 10

2,4-bis-(dibutylamino)-6-N-hydroxyamino-s-triazine

A slurry of 1 mole of cyanuric chloride was prepared in acetone/water and 2 moles of dibutylamine was added dropwise thereto accompanied by stirring and cooling. An aqueous solution containing 2 moles of sodium hydroxide was added at a temperature of 40°–45°, the pH being maintained at slightly pink to phenolphthalein. Two liquid phases were obtained. The upper organic phase was dissolved in ether, washed with water, dried with anhydrous magnesium sulphate, filtered and concentrated to constant weight. There was obtained in 95% yield 2,4-bis-(dibutylamino)-6-chloro-s-triazine.

Free hydroxylamine was prepared, under nitrogen, by the addition, at a temperature of less than 22°, of 1 mole of aqueous sodium hydroxide to 1.06 moles of concentrated hydroxylamine hydrochloride solution. To this solution was added, in a thin stream at a temperature of 2°–6°, a solution of 0.25 mole of the 2,4-bis-(dibutylamine)-4-chloro-s-triazine, prepared by the above procedure, in dioxane. The resulting solution was heated at a temperature of 55°–60°, for 1 hour, then at reflux for 3.5 hours. The mixture was cooled and the reaction product was then added to 1 liter of water. The phases were separated. The upper organic phase was dissolved in ether, washed with water, dried with anhydrous magnesium sulphate and concentrated to constant weight under vacuum. The product partially crystallized on standing. This was followed by slurrying with n-heptane, cooling to −10° and then the mixture was filtered, while cold. The resulting colorless fine needles exhibited a melting point of 78°–81°, and on recrystallization from methanol/water, the melting point was 79.5°–81.5°.

Analysis for $C_{19}H_{38}N_6O$.—Calc'd (percent): C, 62.26; H, 10.45; N, 22.93. Found (percent): C, 62.10; H, 10.29; N, 23.20.

EXAMPLE 11

3-(N-propyl-N-hydroxyamino)propionamide

Propyl hydroxylamine (7.5 g., 0.1 mole) was dissolved in 10 mls. of methanol. To this was added, at a temperature of 25°–30°, 7.1 g. acrylamide (0.1 mole) in 10 mls. of methanol. The reaction was exothermic. The reaction mixture was heated to 60° and kept at this temperature for 2 hours. The methanol was evaporated under vacuum and the product was recrystallized from benzene. A yield of 4.9 g. of the desired product melting between 101° and 103° was obtained.

Analysis for $C_6H_{14}N_2O_2$.—Calc'd. (percent): C, 49.29; H, 9.65; N, 19.16. Found (percent): C, 49.49; H, 9.75; N, 9.14.

EXAMPLE 12

β,β'-hydroxylimino-bis-propionamide

Hydroxylamine hydrochloride (28 g.) was dissolved in 250 mls. of methanol. Sodium methylate (21.6 g., 0.4 mol) in 200 mls. of methanol was added at a temperature of 0°–5°. Sodium chloride precipitated at this point. Acrylamide (57 g., 0.8 mol) in 150 mls. of methanol was added at a temperature of 10°. No exothermic reaction could be observed at this point. The temperature was allowed to rise slowly and the reaction was exothermic at around 20°–25° and reached a maximum of 28°. When the temperature of the reaction mixture dropped to about 20°, the sodium chloride was filtered off and the solution was allowed to stand over night. Crystallization occurred. The crystals were filtered and then recrystallized from methanol and dried. A yield of 35.2 g. (50.3% yield) was obtained. The melting point was 132.5°–133.5° (decomposition).

Analysis for $C_6H_{13}N_3O_3$.—Calc'd (percent): C, 41.13; H, 7.48; N, 23.99. Found (percent): C, 41.38; H, 7.26; N, 23.87.

EXAMPLE 13

N-propyl-N-(p-chlorobenzyl)-hydroxylamine

Propyl hydroxylamine (2.6 g., 0.11 mol) was dissolved in 50 mls. of ethyl alcohol. p-Chlorobenzyl chloride (17.7 g., 0.11 mol) in 50 mls. of ethyl alcohol was added at room temperature. The reaction was noted to be slightly exothermic. Sodium carbonate (5.8 g.) in 35 mls. of water was then added slowly at 25°–30°. A precipitate of sodium bicarbonate was obtained. The mixture was refluxed for 2 hours and it was noted that most of the sodium bicarbonate dissolved. At room temperature, the mixture was filtered off and the alcohol evaporated leaving a waxy solid residue in water. This was extracted with ether and washed with water. A fluffy solid crystallized from the ether (1.5 g.). The ether solution was evaporated leaving behind 17.2 g. of a low melting solid. This material was dissolved in ether, extracted with dilute hydrochloric acid and the aqueous extract washed with ether. The aqueous solution was neutralized with sodium hydroxide, extracted with ether. The ethereal solution was washed with water, dried and then evaporated. The crude yield of product was 13.7 g.; melting point 48°–56°. On recrystallization from hexane, a yield of 9.4 g. (42.9%) was obtained; melting point 64°–66°.

Analysis for $C_{10}H_{14}NOCl$.—Calc'd (percent): C, 60.15; H, 7.07; N, 7.01. Found (percent): C, 60.5; H, 6.99; N, 7.07.

EXAMPLE 14

Sodium 3-(N-n-propyl-N-hydroxyamino) propane sulfonate

The reaction of 0.1 mole of n-propyl hydroxylamine with 0.1 mole of propane sultone was allowed to take place in benzene for 3 days at ambient temperature. The benzene was decanted from a colorless viscous liquid product which was concentrated to constant weight under vacuum. The yield of sulfonic acid was 78%; the neutral equivalent was 220 (theory 197). The acid was converted in aqueous solution to the sodium salt by reaction with an equivalent amount of sodium hydroxide. The aqueous solution was concentrated to dryness. The colorless foamy solid was triturated with benzene, filtered and dried.

Analysis for $C_6H_{14}NO_4SNa$. — Calc'd: S, 14.63%. Found: S, 14.06%.

EXAMPLE 15

Bis-(3,5-di-t-butyl-4-hydroxybenzyl) hydroxylamine

A solution of hydroxylamine was prepared under nitrogen by the neutralization of a solution of 28.5 g. (0.41 mole) of hydroxylamine hydrochloride in 33 ml. water with 16 g. (0.40 mole) of sodium hydroxide in 35 ml. water at <20°. To this solution was added dropwise at 2°–6° over 30 minutes a solution of 25.5 g. (0.10 mole) of 3,5-di-t-butyl-4-hydroxybenzyl chloride in 100 ml. of dioxane. The reaction mixture was heated at 50°–55° for 1 hour and at reflux for 1 hour. The reaction product was evaporated under vacuum to remove dioxane and the residue was extracted with ether. The organic phase was washed with water, dried with anhydrous $MgSO_4$ and filtered. The ethereal solution was concentrated to dryness. The residue was triturated with petroleum ether to yield a solid which was recrystallized twice from benzene, M.P. 195°–197°.

Analysis for $C_{30}H_{47}NO_3$.—Calc'd percent: C, 76.71; H, 10.09; N, 2.98. Found (percent): C, 77.49; H, 9.77; N, 2.81.

The IR and NMR spectra were in conformance with the structure.

Depending upon the material to be protected and the severity of oxidation to be encountered, various concentrations of the compounds of this invention may be employed as anti-oxidants. Generally, from about 0.001% by weight of one or more of the active compounds of the present invention to about 5 percent is employed. However, in many instances, concentrations of anti-oxidant well below the latter figure give adequate protection. Thus, lubricating oil concentrations of from 0.01 to 2 percent by weight of the active compound are usually adequate. Generally it is preferred to use from 0.05 to about 3 percent by weight of the additive compound since it is found that concentrations within this range provide adequate anti-oxidant protection.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claim.

What is claimed is:

1. The compound didodecyl β,β-hydroxyimino-dipropionate.

References Cited

L. Wolf, et al., J. pract. chem. [4], 5, 14–20 (1957).

LORRAINE A. WEINBERGER, Primary Examiner

P. J. KILLOS, Assistant Examiner

U.S. Cl. X.R.

260—247, 248 A, 249.5, 249.6, 249.8, 268 R, 293.51, 293.89, 389, 471 A, 508, 513 N, 558 A, 570 R, 570.9, 583 DD